(12) United States Patent
Anderson et al.

(10) Patent No.: US 8,083,447 B2
(45) Date of Patent: Dec. 27, 2011

(54) CHOCK STRAP RETAINER FOR AUTO-RACK RAILROAD CAR VEHICLE WHEEL CHOCK

(75) Inventors: John D. Anderson, Aurora, IL (US); Walter J. Peach, Montgomery, IL (US)

(73) Assignee: Standard Car Truck Company, Park Ridge, IL (US)

( * ) Notice: Subject to any disclaimer, the term of this patent is extended or adjusted under 35 U.S.C. 154(b) by 337 days.

(21) Appl. No.: 12/407,336

(22) Filed: Mar. 19, 2009

(65) Prior Publication Data

US 2009/0245962 A1    Oct. 1, 2009

Related U.S. Application Data

(60) Provisional application No. 61/041,107, filed on Mar. 31, 2008.

(51) Int. Cl.
B60P 3/077    (2006.01)
(52) U.S. Cl. ........................................ 410/30
(58) Field of Classification Search ............. 410/19, 410/21, 30, 36, 42, 47, 49
See application file for complete search history.

(56) References Cited

U.S. PATENT DOCUMENTS

| | | | |
|---|---|---|---|
| 2,011,469 | A | 8/1935 | Brueggemann |
| 4,135,668 | A | 1/1979 | Winkler et al. |
| 4,659,266 | A | 4/1987 | Thelen et al. |
| 4,668,140 | A | 5/1987 | Blunden |
| 4,786,223 | A | 11/1988 | Crissy et al. |
| 4,804,070 | A | 2/1989 | Bohler |
| 4,836,726 | A | 6/1989 | Robertson et al. |
| 4,838,743 | A | 6/1989 | Blunden et al. |
| 4,875,813 | A | 10/1989 | Moyer et al. |
| 4,944,476 | A | 7/1990 | Olson |
| 4,971,492 | A | 11/1990 | Moyer et al. |
| 5,011,347 | A | 4/1991 | Bullock |
| 5,037,255 | A | 8/1991 | Bullock et al. |
| 5,106,245 | A | 4/1992 | Fritz et al. |
| 5,145,076 | A | 9/1992 | Murphy et al. |
| 5,211,266 | A | 5/1993 | Meyer |
| 5,302,063 | A | 4/1994 | Winsor |
| 5,312,213 | A | 5/1994 | Winsor |
| 5,316,421 | A | 5/1994 | Bullock et al. |
| 5,549,262 | A | 8/1996 | Whitehead |
| 5,630,519 | A | 5/1997 | Burke et al. |
| D389,796 | S | 1/1998 | Olson |
| 5,736,088 | A | 4/1998 | Burke et al. |
| D407,059 | S | 3/1999 | Henry |
| 5,927,928 | A | 7/1999 | Hageman et al. |
| 6,357,987 | B1 | 3/2002 | Palus |
| 6,585,211 | B1 | 7/2003 | Hageman et al. |
| 6,708,625 | B1 | 3/2004 | Burke et al. |
| 7,114,210 | B2 | 10/2006 | Heinz |
| 7,213,771 | B2 | 5/2007 | Chappell et al. |
| D560,142 | S | 1/2008 | Hutchison |
| D586,286 | S * | 2/2009 | Anderson et al. ............ D12/217 |
| 7,513,725 | B1 | 4/2009 | Bullock |

* cited by examiner

*Primary Examiner* — H Gutman
(74) *Attorney, Agent, or Firm* — K&L Gates LLP

(57) ABSTRACT

A chock strap retainer configured to be inserted in the reeling shaft or torque tube of a wheel chock to secure the chock strap to the reeling shaft or torque tube. When the chock strap is draped over the tire and tension is applied to the chock strap, the chock strap retainer provides that the chock strap remains securely affixed inside the torque tube. The chock strap retainer ensures that different sized and/or a different dimensioned chock straps remain securely affixed inside the torque tube of the wheel chock when the vehicle chock is employed.

19 Claims, 13 Drawing Sheets

US 8,083,447 B2

CHOCK STRAP RETAINER FOR AUTO-RACK RAILROAD CAR VEHICLE WHEEL CHOCK

PRIORITY CLAIM

This application is a non-provisional application of, claims priority to and the benefit of U.S. Provisional Patent Application, Ser. No. 61/041,107, filed on Mar. 31, 2008, the entire contents of which are incorporated herein.

BACKGROUND

The railroad industry employs a variety of auto-rack railroad cars for transporting newly-manufactured vehicles such as automobiles, vans and trucks. Auto-rack railroad cars, known in the railroad industry as auto-rack cars, often travel thousands of miles through varying terrain. One typical type of auto-rack car is compartmented, having two or three floors or decks, two sidewalls, a pair of doors at each end, and a roof. Newly manufactured vehicles are loaded into and unloaded from an auto-rack car for transport by a person (sometimes called a "loader") who drives the vehicles into or out of the auto-rack car.

One problem with auto-rack cars is the potential for damage to newly manufactured vehicles which can occur in the auto-rack car due to the unwanted movement of one or more of the transported vehicles not adequately secured in the auto-rack car. Various restraint or anchoring systems have been developed for securing the vehicles transported in auto-rack cars to prevent movement or shifting of those vehicles during transportation. The loader typically positions these vehicle restraint or anchoring systems.

One known type of restraint system employs a "tie down" restraint using chains connected to steel runners in the support surface of the auto-rack car. A ratchet tool is usually required to secure these chains taut. Certain types of these known systems utilize winch mechanisms and harnesses which must be fitted over the vehicle tires to restrain movement of the vehicle.

To solve the disadvantages of such mechanisms, various vehicle restraint systems for restraining vehicles transported on auto-rack cars have been developed. Examples of various vehicle restraint systems are disclosed in detail in U.S. Pat. Nos. 4,875,813; 5,037,255; 5,106,245; 5,312,213; 5,316,421 and 5,302,063. These vehicle restraint systems include a plurality of wheel chocks each detachably securable to a support surface of the auto-rack car and an over-the-wheel harness or chock strap which secures one of the tires of the vehicle being transported to the support surface of the auto-rack car. To secure each tire of the vehicle being transported, a wheel chock is place in front of the tire, a wheel chock is placed in back of the tire, and the harness or chock strap is attached to both of these wheel chocks and draped over the tire. The harness or chock strap is then tensioned (utilizing a rotatable torque tube of at least one of the wheel chocks) to hold the draped chock strap in taut condition. Accordingly, the over-the-wheel harness or chock strap keeps the wheel of the car from bouncing over the restraint at times when the railway car is subjected to unusually large impacts. These types of vehicle restraint systems have been widely employed in tri-level auto-rack cars to secure vehicles.

More specifically, to tension the chock strap, an end of the chock strap is attached to a tubular steel reeling shaft or torque tube of the wheel chock. A portion of the torque tube contains a pair of diametrically opposed slots sized to receive the chock strap. The chock strap is affixed to the shaft by threading its first free end through both a first of the slots and a second of the slots, wrapping the chock strap halfway around the torque tube, threading the hem back through the first of the slots, and pulling the second free end of the chock strap to secure the folded first end or hem into the interior of the torque tube. Such a configuration provides that when the original equipment manufacturer ("OEM") chock strap is tensioned, the chock strap will substantially fill the first of the slots of the torque tube and catch onto itself in the interior of the torque tube to remain securely affixed to the torque tube (and thus enable the chock strap to hold down a tire of the vehicle being transported).

Despite their wide employment in the railroad industry, these OEM chock straps often become cut, torn or otherwise worn or damaged and often need to be replaced. However, the replacement chock straps are often of different sizes and different dimensions than the OEM chock straps. Such different sized replacement chock straps do not provide a proper fit in the interior of the torque tube (i.e., they move around the interior of the torque tube or do not adequately fill the first slot of the torque tube when tension is applied to the chock strap) and thus do not remain securely affixed to the torque tube of the wheel chock. More specifically, one such problem occurs if the replacement chock straps are thinner than the OEM chock straps in this case, the thinner replacement chock strap will fill in or utilize less of the space defined by the slots of the torque tube and thus leave additional space for the replacement chock strap to move or wiggle. This situation additionally provides that when the replacement chock strap is threaded through the torque tube, the formed hem of the replacement chock strap is also thinner and does not remain secure in the interior of the torque tube (i.e., the hem is too thin relative to the size of the interior of the torque tube to properly catch onto itself when the chock strap is drawn snug) and thus the chock strap does not remain secure. Another problem occurs if the hem of the replacement chock strap is longer than the hem of the OEM chock strap. In this case, when the hem is threaded through the torque tube, part of the hem extends through the torque tube and the replacement chock strap is unable to wrap onto itself to remain secure.

Such insecure chock straps present many problems for the railroad industry. One such problem is that while the draped and drawn chock strap initially appears to provide adequate restraint to a car loader, as tension is applied to the chock strap, the insecure chock strap becomes undone. Once undone, the tire is free to bounce over the placed wheel chocks and cause damage to the vehicle being transported. Such damage provides an additional cost to the railroad transporting the vehicle. Another such problem is that the car loader has difficulty in tensioning the draped chock strap to an adequate level of tightness (due to the insecure chock strap not catching on itself) to secure the wheel of the vehicle being transported. Such a problem leads to the car loader having to spend additional time to tension the chock strap properly (and the associated labor costs with the additional time) or the car loader not adequately tensioning the chock strap (and the possibility that the vehicle being transported could be damaged).

Accordingly, a need exists to ensure that different chock straps of different dimensions remain securely affixed to the torque tube of a wheel chock.

SUMMARY

The chock strap retainer of the present disclosure is configured to be inserted in the reeling shaft or torque tube of a wheel chock to secure the chock strap to the reeling shaft or torque tube. When the chock strap is draped over the tire and tension is applied to the chock strap, the chock strap retainer provides that the chock strap remains securely affixed inside the torque tube. That is, the chock strap retainer disclosed herein solves the above-described problems by ensuring that different sized and/or a different dimensioned chock straps remain securely affixed inside the torque tube of the wheel chock when the vehicle chock is employed.

In one embodiment, the chock strap retainer disclosed herein includes a body and a head or stopping member attached to one end of the body. The body includes: (a) a torque tube securer attached to the head and configured to secure the chock strap retainer in the torque tube; and (b) a chock strap engager attached to the torque tube securer and configured to secure the chock strap retainer in the torque tube. The torque tube securer includes a spine, a plurality of torque tube inner wall engagers extending from the spine, and a plurality of locking lips. Each locking member or lip extends from a respective one of the torque tube inner wall engagers. The chock strap engager includes a torque tube engaging base attached to the torque tube securer, an insertion end attached to the torque tube engaging base, and a plurality of chock strap locking fingers or pins attached to and extending from the torque tube engaging base.

In operation, a chock strap is affixed to a torque tube of a wheel chock as described above such that a folded end or hem of the chock strap is drawn into the interior of the torque tube and then wrapped around the tube. After the folded end or hem of the chock strap is drawn into the interior of the torque tube and wrapped around the tube, the chock strap retainer is positioned parallel or substantially parallel to a free, open end of the torque tube (adjacent to the folded end of the chock strap) and a force is applied to the chock strap retainer to drive the chock strap engager into the torque tube. As the chock strap engager is driven into the torque tube, the torque tube securer is suitably driven into the torque tube. This process continues until the head or stopping member engages the end of the torque tube.

When the chock strap retainer is inserted in the torque tube, the torque tube securer secures the chock strap retainer inside the torque tube and the chock strap engager engages the chock strap situated inside the torque tube. Specifically, in one embodiment, the locking lips of the torque tube securer and/or the torque tube inner wall engagers engage first portions of the inner wall of the torque tube and the torque tube engaging base engages second portions of the inner wall of the torque tube to secure the chock strap retainer inside the torque tube. In this embodiment, the locking fingers or pins of the chock strap engager engage the chock strap. These various engagements provide a secure connection between the chock strap and the chock strap retainer and ensure that the chock strap remains securely pressed against the inner wall of the torque tube (and thus the chock strap remains securely inserted inside the torque tube). That is, when tension is applied to the affixed end of the chock strap (i.e., the free end of the chock strap is draped over a vehicle wheel and drawn snug), the locking fingers or pins of the chock strap engager of the secured chock strap retainer engage various positions of the chock strap to secure the affixed end of the chock strap inside the torque tube to enable the chock strap to be drawn in taut condition without the chock strap unwinding or otherwise becoming non-functional.

Accordingly, the chock strap retainer disclosed herein provides that regardless of the dimensions of the chock strap utilized, such chock straps are held securely in the interior of the torque tube of a wheel chock to ensure that the chock strap can be drawn taut to restrain the wheel of the vehicle being transported.

Other objects, features and advantages of the present invention will be apparent from the following detailed disclosure, taken in conjunction with the accompanying sheets of drawings, wherein like reference numerals refer to like parts.

DETAILED DESCRIPTION

Figure 1:
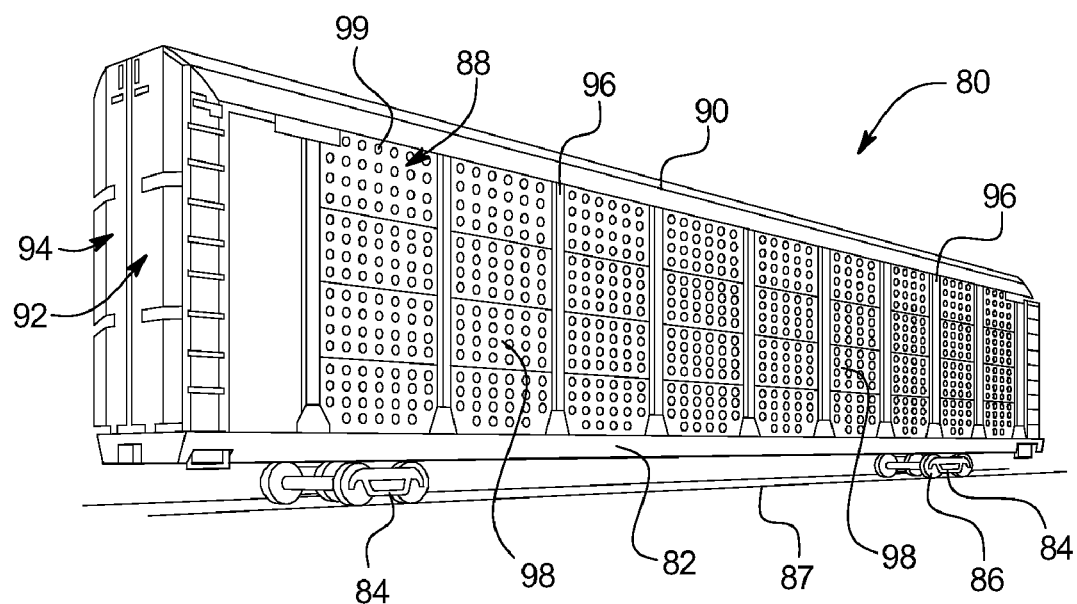
FIG. 1 is a perspective view of an auto-rack railroad car configured to transport a plurality of vehicles.

Referring now to the drawings and particularly to FIG. 1, a typical auto-rack car 80 includes a frame 82 supported by trucks 84, each of which have several wheels 86 which roll along railroad tracks 87. The frame 82 supports two sidewalls 88 and a roof 90. The auto-rack car includes a pair of co-acting clamshell doors 92 and 94 mounted on each end of the auto-rack car 80. The doors 92 and 94 are opened to facilitate the loading and unloading of vehicles into and out of the auto-rack car and are closed during transport or storage of the vehicles.

The sidewalls 88 include a series of steel vertical posts 96 which are mounted on, and extend upwardly from, the frame 82. The roof 90 is mounted on, and supported by, these vertical posts. The vertical posts are evenly spaced along the entire length of both sidewalls 88 of the auto-rack car 80. A plurality of rectangular galvanized steel side wall panels 98 which extend horizontally and are vertically spaced apart are mounted between each pair of vertical posts 96. These side wall panels are supported at their corners by brackets (not shown) that are suitably secured to the vertical posts. The average side wall panel has a multiplicity of round sidewall panel holes 99. These side wall panel holes 99 provide the auto-rack car with natural light as well as proper ventilation. Proper ventilation prevents harm from the toxic vehicle fumes to the person or persons (i.e., loaders) loading or unloading the vehicles into or out of the auto-rack car.

The auto-rack car may be a tri-level car having first, second and third levels. Normally, eighteen passenger vehicles can be transported in a tri-level auto-rack car, six on each level. The auto-rack car can also have two levels for vehicles instead of three. The bi-level auto-rack car has a lower level and an upper level. The bi-level auto-rack car is generally used to transport larger vehicles, such as vans, mini-vans, pickup trucks, four-by-four and cross-over vehicles. The bi-level auto-rack car can usually transport twelve of these vehicles, six on each level. The auto-rack car may also be a single-level car.

The chock strap retainer disclosed herein is configured to be used in association with a vehicle wheel chock which includes a torque tube for tensioning a chock strap over a tire of a vehicle. It should be appreciated that while FIGS. 2 to 6 and the accompanying description relating to these figures illustrates one suitable wheel chock, the chock strap retainer disclosed herein may be used in conjunction with any suitable wheel chock which utilizes a torque tube and an over-the-wheel harness.

As seen in FIGS. 2 to 6, the main component of the illustrated wheel chock is a monolithic body 11. The body is formed from an aluminum casting, a synthetic plastic molding or any suitable material possessing good impact strength over the range of temperatures encountered by railroad cars. The body 11 of the chock has an open bottom, and a top defined by central ridge walls including a domed portion 12a adjoining transverse wall 13 at the outboard end of the body, a portion 12b located at the opposite end of the body and containing an opening 14, and an intermediate portion 12c which is taken up almost entirely by a large window opening 15. The ridge wall is flanked by a pair of side walls, each of which includes a wheel-engaging surface 16 or 17 which slopes downward at an angle of about 55° to 60° with respect to the horizontal and joins a depending surface 18 or 19. The side walls are symmetrical about the central, longitudinal vertical plane of the body 11, which gives the chock a universal character, (i.e., the chock may be positioned either in front of or behind a vehicle wheel or tire). Each of the surfaces 16 and 17 contains a pair of openings 21 and 22 near its outboard end defining hand grips which enable the chock to be carried and manipulated by the loaders. Each surface also contains a keyhole shaped opening 23 near its inboard end to hang the chock from a headed pin fastened to the side screen of the railway car.

The side walls of the body 11 of the chock are connected with each other and with the ridge wall by three transverse webs 24, 25 and 26, each of which extends over the entire cross section of the body at the station at which it is located. The body 11 also includes a fourth transverse web 27 extending over only the upper portion of the cross section of the body and joined to web 26 by a pair of horizontal shelf-like webs 28 and 29 running along the side walls.

Figure 2:
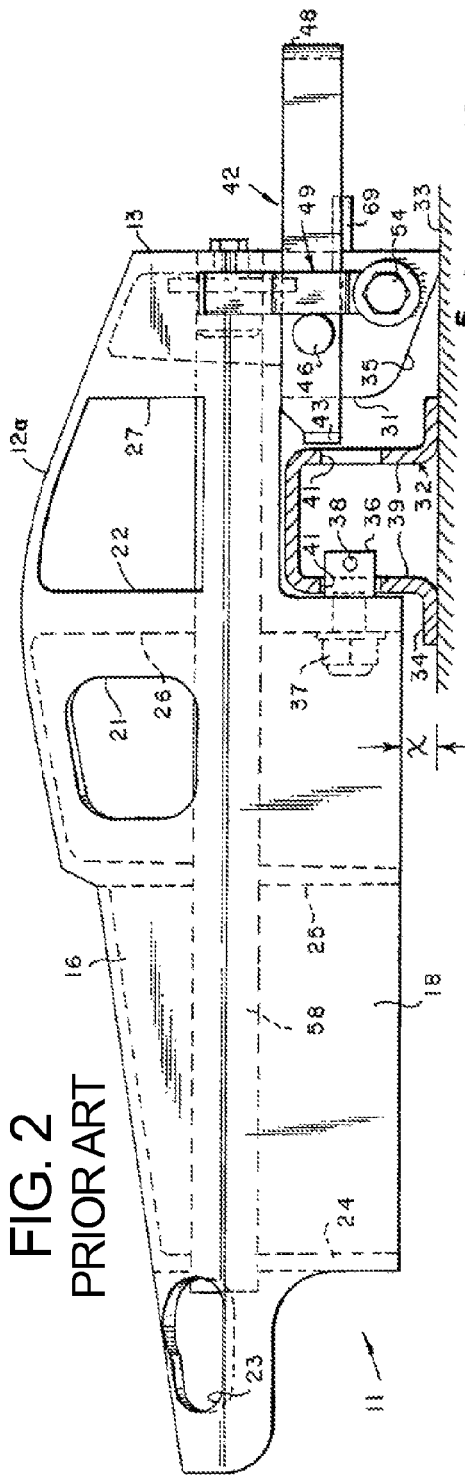
FIG. 2 is a side elevation view of a conventional wheel chock positioned on a mounting rail.
Figure 3:
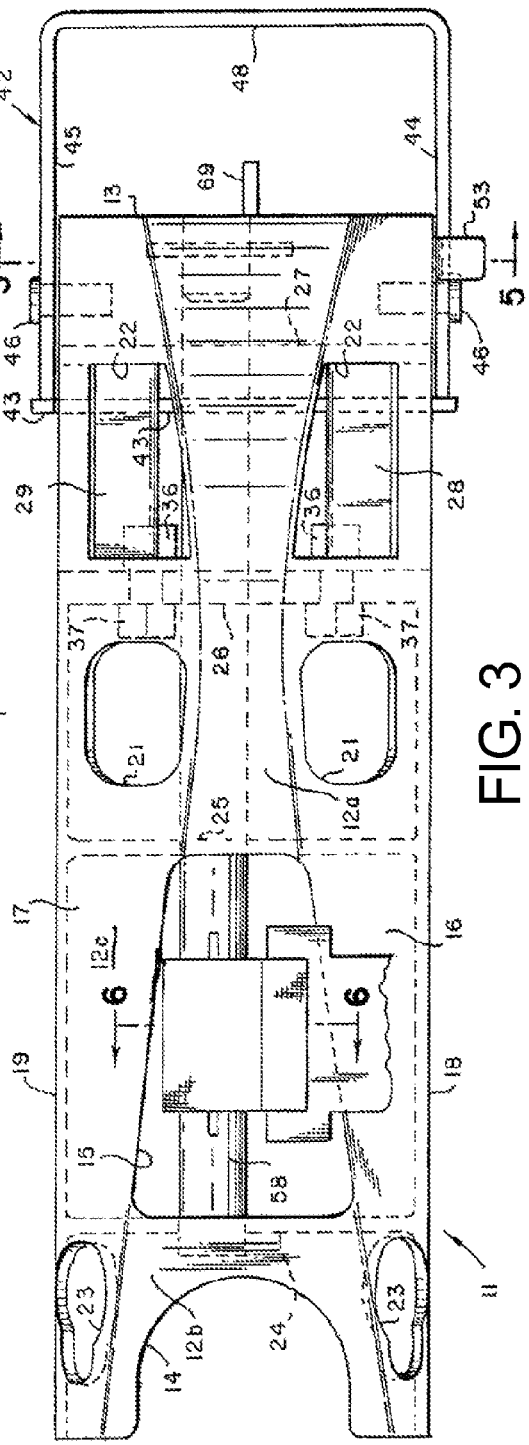
FIG. 3 is a top plan view of the wheel chock of FIG. 2.

The body 11 is spanned by a transverse recess 31 which opens through vertical side surfaces 18 and 19 and is adapted to receive a standard hat section mounting rail 32 which extends lengthwise of, and is welded to, the deck 33 of the auto-rack car. This recess 31 is bounded at the top by horizontal webs 28 and 29 and at the inboard side by transverse web 26. As depicted in FIG. 2, the bottom of that portion of the body 11 extending inboard from recess 31 is elevated a distance X of approximately ⅜" above the bottom of the wall 13. This spacing provides clearance for the inboard flange 34 of rail 32 and also enables the chock to assume a substantially horizontal orientation when deck 33 is crowned. As seen in FIG. 2, the bottom edges of side wall surfaces 18 and 19 outboard of recess 31 are cut back 35 to provide clearance for a latching member.

The chock is fixed to rail 32 by a pair of cylindrical steel locking pins 36 projecting into recess 31 from web 26. These pins have threaded shanks which pass through bores formed in web 26 and are secured by self-locking nuts 37. The pins contain small cross bores 38 to be held by an awl while the nuts are tightened. Each of the upright walls 39 of rail 32 contains a longitudinal series of 1" diameter holes 41 located on 1½" centers, and locking pins 36 are sized and spaced to fit into alternate holes of this series. The pins have a diameter of ¾" and are installed with a center-to-center spacing of 2¾". The pins 36 extend about ½" into recess 31, and the width of this recess is selected to afford an unobstructed or free space about 1/16" wider than rail 32 (at maximum tolerance). As a result, the chock is installed by lowering it onto the rail and then shifting it laterally to engage pins 36 in the holes 41. The height of recess 31 is about 1/16" greater than the maximum permitted height of rail 32, so horizontal webs 28 and 29 are close to, but do not rest on, the rail when the chock is mounted in place.

For normal usage, the chock includes a latching mechanism which prevents withdrawal of either of the pins 36 from holes 41. This mechanism includes a four-sided frame 42 made from a steel bar of rectangular cross section which is bent to U-shape and is welded at its free ends to a similar straight bar 43. The sides 44 and 45 of frame 42 are journaled on headed pivot pins 46 which pass through openings in body surfaces 18 and 19 and are retained by cotter pins 47. Therefore, frame 42 is free to swing in a vertical plane about the outboard end of body 11. In the latching position of frame 42, which is illustrated in FIG. 2, bar 43 is positioned along and close to the outboard upright wall 39 of rail 32. The distance between bar 43 and transverse web 26 is approximately 1/16" greater than the maximum width of rail 32; therefore, lateral movement of the chock is limited sufficiently to preclude withdrawal of pins 36 from holes 41. The latch is released by grasping frame side 48, which serves as a handle, and swinging frame 42 counterclockwise to a substantially vertical, unlatching position wherein bar 43 is outside recess 31 and in abutment with side wall portions 35. The bar 43 is narrower than the frame, the bar is located flush with the bottom of the frame, and the top corners of sides 44 and 45 are beveled to provide sufficient clearance to avoid interference between the latch and the outboard flange of rail 32 during movement.

Frame 42 is retained in latching position by a spring steel keeper or lock 49 bolted to side wall surface 18. Lock 49 is formed with a pocket 51 sized to receive frame side 44 and having a wall 52 which coacts with the upper margin of side 44 to hold frame 42 in latching position. The lock includes an integral nose or protruding release portion 53 which, when manually pressed to flex the lock outward about its mounting bolt 54, removes wall 52 from the path of travel of frame side 44 to enable the frame to be pivoted toward unlatching position. In the unlatching position of frame 42, the lock 49 is positioned to partially overlap side 44 and bears against its outer face. Accordingly, the lock acts as a friction grip which prevents movement of the frame from the unlatching position. As a result, the latch is activated by pulling handle side 48 down. It should be appreciated that lock 49 automatically snaps into locking position to capture side 44 as the frame 42 is pivoted into latching position.

Figures 4, 8:
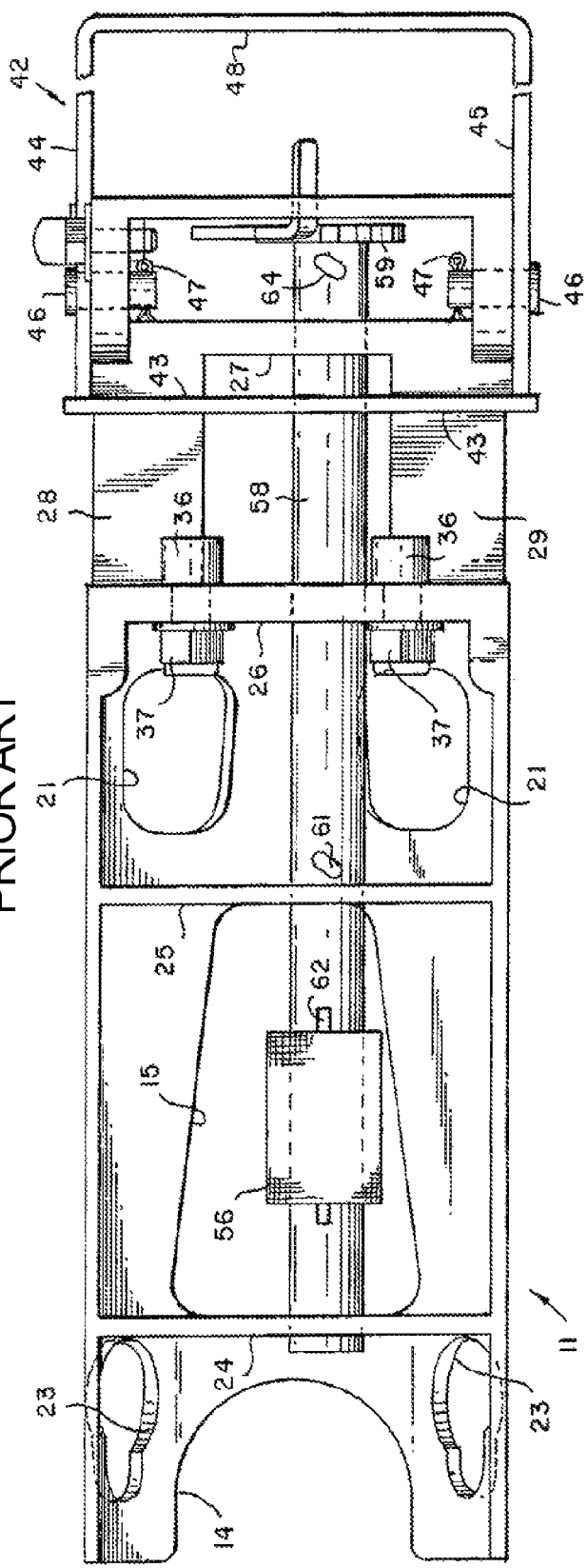
FIG. 4 is a bottom plan view of the wheel chock of FIG. 2.
FIG. 8 is a fragmentary top plan view of a over-the-wheel harness or chock strap used in conjunction with two of the wheel chocks of FIG. 2.

FIG. 8 illustrates a suitable harness or chock strap which may be used in association with the chock strap retainer disclosed herein. For example, such a harness or chock strap includes five strips of nylon webbing, three of which are stitched together to form a central wheel-engaging portion 55, and the remaining two defining end straps 56 which are attached to portion of 55 by steel D-rings 57. Both end straps may be permanently attached to the D-rings, or one may be stitched in place and the other provided with a hook (as seen in FIG. 7) which enables removable attachment.

As described above, the chock strap includes a suitable mechanism for attaching a free end of the chock strap 56 and tensioning the chock strap. That mechanism includes a rotatable tubular steel reeling shaft or torque tube 58. The portion of the shaft or torque tube 58 underlying body window 15 includes a pair of diametrically opposed slots 62 (as seen in FIG. 7) sized to receive the chock strap 56. One suitable method of attaching the chock strap to the torque tube includes threading its free end through both of the slots 62, folding the end over and attaching it to the main body of the chock strap, as by a staple 63, and then pulling the chock strap to draw the folded end into the interior of the shaft (as seen in FIG. 7). Although not shown, it should be appreciated that the chock strap retainer of the present disclosure can be employed with this arrangement.

Figure 9:
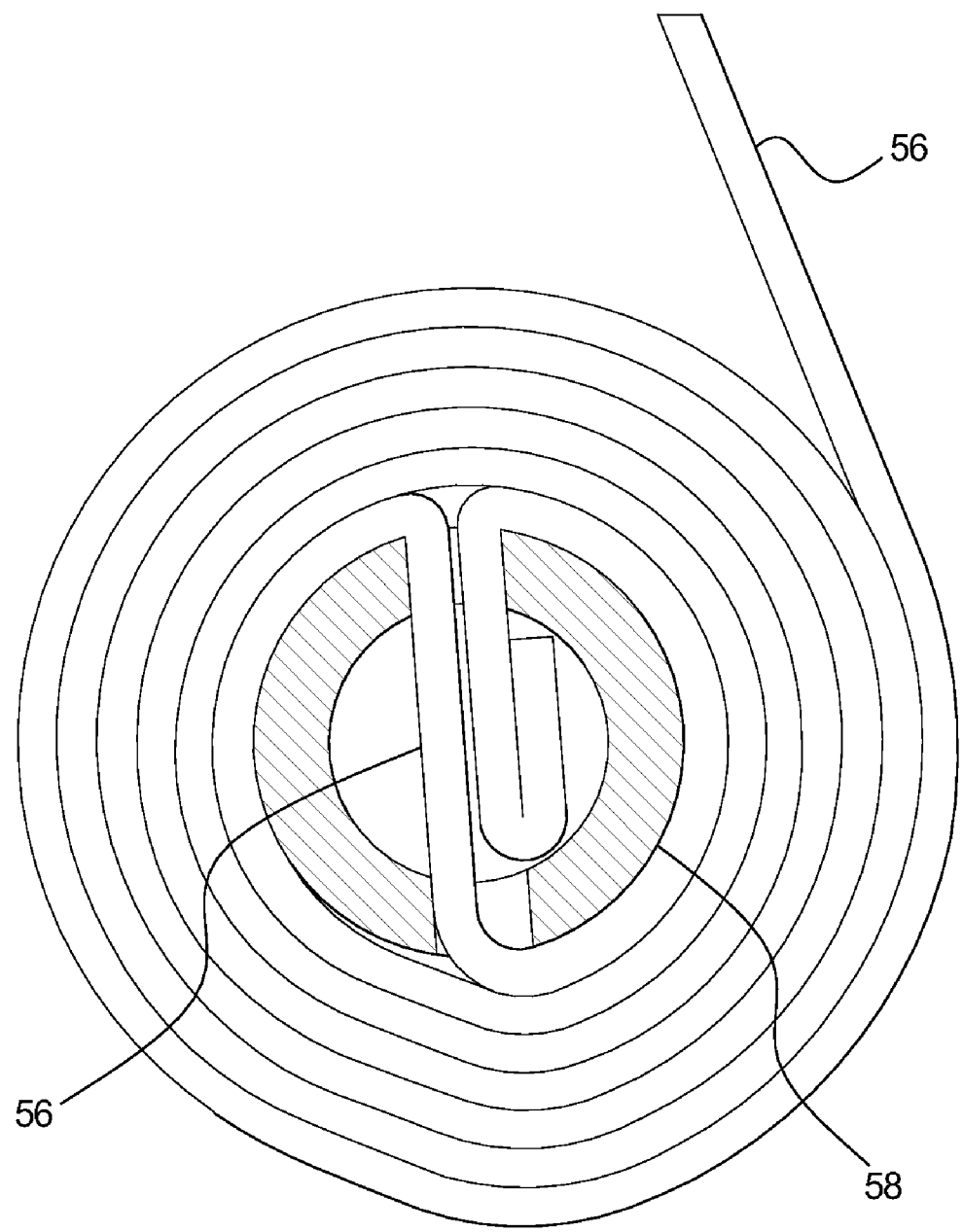
FIG. 9 is an enlarged partial fragmentary side view and partial sectional view of a chock strap affixed to a torque tube of the wheel chock which is taken substantially along line 9--9 of FIG. 11, and illustrating the interior of the torque tube prior to the utilization of the chock strap retainer disclosed herein.

Another suitable method of attaching the chock strap to the torque tube includes threading its first free end through both a first of the slots and a second of the slots, wrapping the chock strap halfway around the torque tube, threading the hem back through the first of the slots, and pulling the second free end of the chock strap to secure the hem into the interior of the torque tube (as seen in FIG. 9). The present disclosure is discussed herein primarily in conjunction with this arrangement. It should be appreciated, that the present disclosure is not limited for use with these two arrangements.

Figure 7:
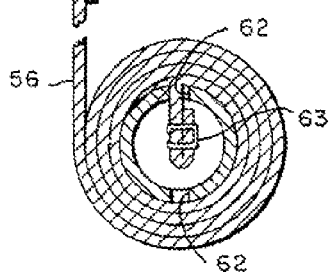

It should be appreciated that as seen in FIGS. 7 and 9, after a suitable chock strap 56 is threaded through the slots of the torque tube, an amount of free space occupies the inner portion of the torque tube. Such an amount of free space provides room for different sized and different dimensioned chock straps to move and slip out of the slots of the torque tube, thus becoming unwound and non-functional. It should be further appreciated that if the first end of the chock strap is not stapled to the main body of the chock strap (but is attached by another suitable mechanism), the chock strap may become loose in the interior of the torque tube because there is no staple to engage an inner wall of the torque tube to partially prevent the chock strap from disengaging the torque tube.

Figure 5:
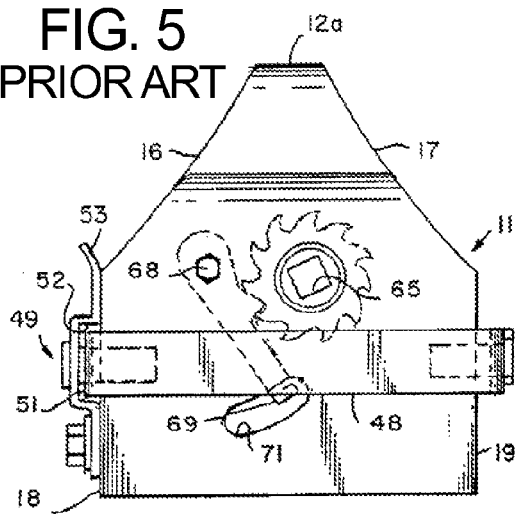
FIG. 5 is an elevation view of the outboard end of the wheel chock of FIG. 2.
Figure 6:
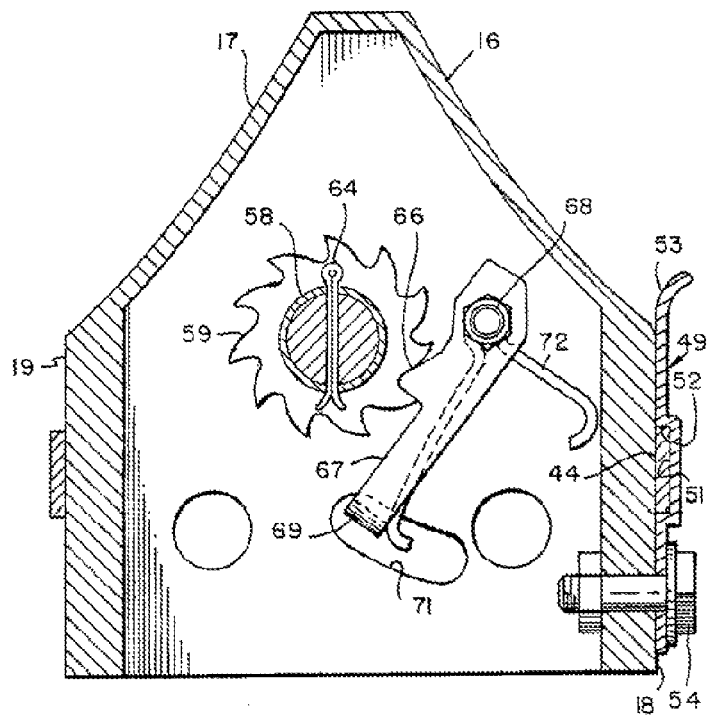
FIGS. 6 and 7 are sectional views taken substantially along lines 5-5 and 6-6, respectively, of the wheel chock illustrated in FIG. 3, and drawn on different scales.

In the illustrated chock, the torque tube is positioned in aligned bores formed in transverse webs 24 to 27 and equipped with a ratchet wheel 59 at its outboard end. Ratchet wheel 59, which coacts with end wall 13, and a cotter pin 64, holds the torque tube 58 against axial displacement. Ratchet wheel 59 has an integral stub shaft which projects into the outboard end of torque tube 58 and is held there by cotter pin 64, and an oppositely directed, shorter stub shaft which is journaled in a bore extending through end wall 13. The end of the stub shaft is flush with the outer surface of wall 13 and contains a square socket 65 for receiving the ½" drive of a standard ratchet wrench. The ratchet wheel 59 coacts with a pawl 66 formed on a lever 67 pivotally mounted at one end on a bolt 68 fixed in wall 13. At its opposite end, lever 67 is bent to define a release arm 69 which projects from body 11 through an arcuate opening 71 formed in wall 13. A wire spring 72, trained about bolt 68 and formed with curved ends which bear against side wall 18 and arm 69, respectively, biases pawl 66 into engagement with the teeth on wheel 59. Accordingly, the torque tube 58 is rotatable in the counterclockwise direction, as seen in FIG. 5, to reel in the chock strap and to tension the chock strap. It should be appreciated that release arm 69 is within the confines of frame 42 and is positioned at approximately the elevation of handle 48 when the frame is in the latching position. Thus, the frame (and specifically the handle 48), serves as a guard which reduces the risk that a careless loader will inadvertently step on arm 69 and either break it or release the pawl.

In operation, a set or pair of chocks and an over-the-wheel chock strap are utilized to restrain each tire of the vehicle being transported. Specifically, the chocks of one set are placed on mounting rail 32 in positions in front of and behind a vehicle wheel, with the chock strap draped over the wheel. Each chock Is secured in place by swinging frame 42 downward to the horizontal, latching position. Once the chocks are secured, and the end of chock strap 56, if removable, is attached to the rest of the chock strap, a loader inserts the drive of a wrench in socket 65 and rotates the torque tubes 58 as needed to locate D-rings 57 in positions in which they are least likely to contact vehicle body parts during transit. The chock strap is then drawn snug on the wheel by further rotation of one or both of the torque tubes. The other wheel on the same side of the vehicle is restrained in the same way, using a second set of chocks and another chock strap. It should be appreciated that while such a suitable chock is described in relation to use on railway transporters, the chock strap retainer may be utilized in associated with any suitable restraint mechanism, such as over-the-highway, truck type transporters, and marine transporters.

In one embodiment, the chock strap retainer disclosed herein includes a body and a head or stopping member attached to one end of the body. The body includes: (a) a torque tube securer attached to the head and configured to secure the chock strap retainer in the torque tube; and (b) a chock strap engager attached to the torque tube securer and configured to secure the chock strap retainer in the torque tube. In one such embodiment, the torque tube securer includes a spine, a plurality of torque tube inner wall engagers extending from the spine, and a plurality of locking lips. Each locking members or lip extends from a respective one of the torque tube inner wall engagers. In one such embodiment, the chock strap engager includes a torque tube engaging base attached to the torque tube securer, an insertion end attached to the torque tube engaging base, and a plurality of chock strap locking fingers or pins attached to and extending from the torque tube engaging base. In various embodiments, the chock strap engager is suitably formed such that: (i) at least a first portion of the chock strap engager is configured to engage one or more portions of the inner wall of the torque tube, and (ii) at least a second portion of the chock strap engager is configured to engage the chock strap of the wheel chock.

In one embodiment, the body and head of the chock strap retainer are integrally formed or molded from the same material to form the chock strap retainer. In one such embodiment, the chock strap retainer is injection molded. In an alternative embodiment, the body and head of the chock strap retainer are separate pieces and suitably attached to each other, such as connected together, welded together or attached with any suitable fastener. In another embodiment, the torque tube securer and the chock strap engager are separate pieces and suitably attached to each other, such as connected together, welded together or attached with any suitable fastener. In different embodiments, the chock strap retainer may be constructed of any suitable durable material such as any glass filled nylon, any urethane, any polyethylene, any ABS, any aluminum, any steel, any ceramics, any other suitable metals, any other suitable plastics or any combination thereof. It should be appreciated that in certain embodiments, the chock strap retainer disclosed herein is recyclable.

In one such embodiment, the method of forming the chock strap retainer disclosed herein includes melting a suitable plastic material, such as urethane or polyurethane to a temperature of approximately 450° F. (232° C.), injecting or pouring the melted plastic material into a mold or tool maintained at a temperature of approximately 180° F. (82° C.), molding or forming the plastic chock strap retainer from the plastic material in the tool or mold for approximately two minutes, removing the chock strap retainer from the tool or mold, placing the chock strap retainer in a hot water bath maintained at a temperature of approximately 180° F. (82° C.) for approximately 20 minutes, removing the chock strap retainer from the hot water bath, and then allowing the chock strap retainer to cool in air for approximately ten minutes.

Figure 10:
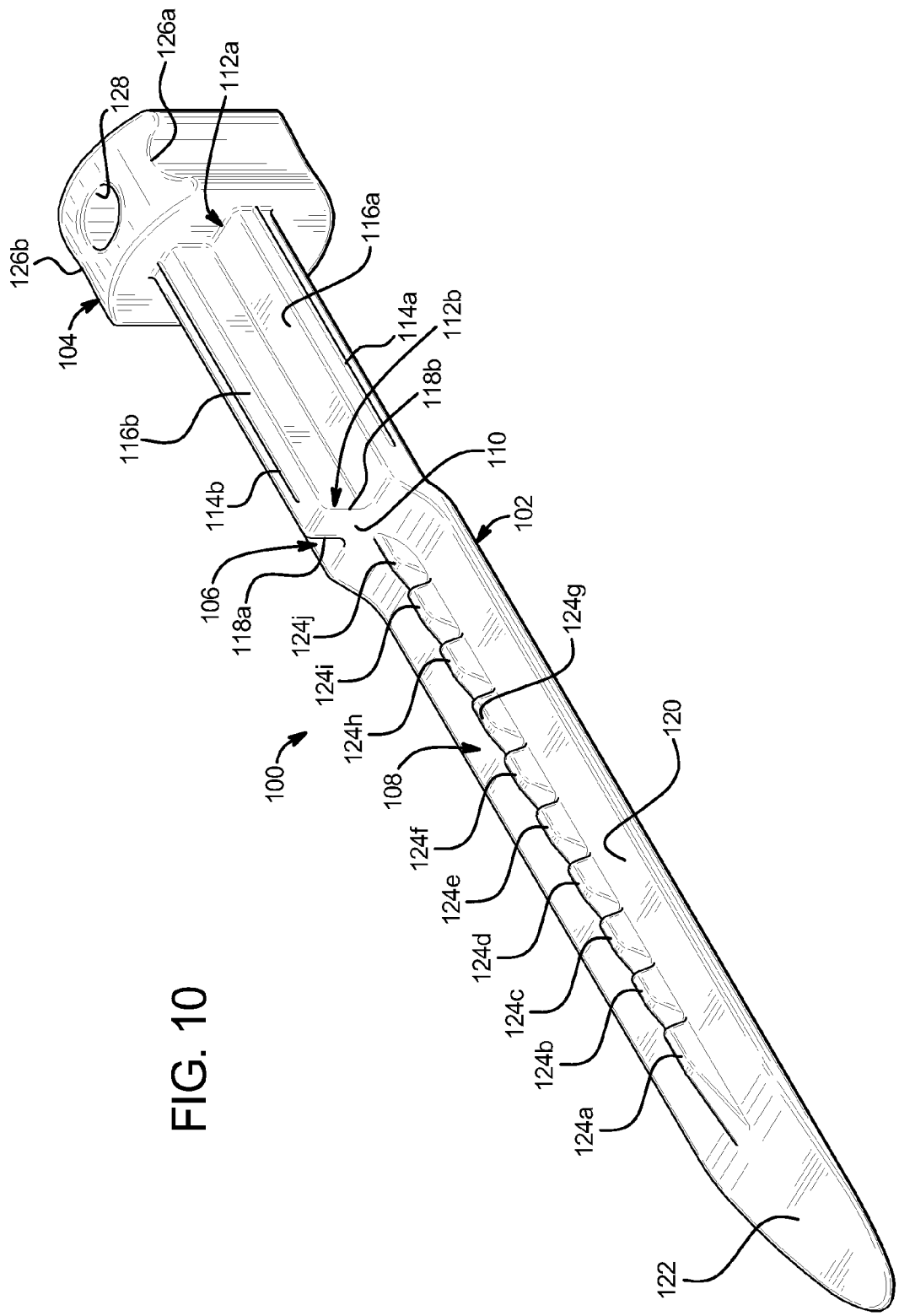
FIG. 10 is a top front perspective view of one embodiment of the chock strap retainer disclosed herein.

In one embodiment, as illustrated in FIG. 10, the chock strap retainer 100 disclosed herein includes a body 102 and a head or stopping member 104 attached to one end of the body. In this embodiment, the body includes a torque tube securer 106 attached to the head and a chock strap engager 108 attached to the torque tube securer. A first end of the torque tube securer 106 is attached to the head or stopping member 104, a second, opposite end of the torque tube securer 106 is attached to a first end of the chock strap engager 108, and a second, opposite end of the chock strap engager forms an insertion end 122.

In this illustrated embodiment, the torque tube securer 106 is suitably formed to engage first portions of the inner wall of the torque tube of the wheel chock. More specifically, the torque tube securer 106 includes a spine 110, a plurality of torque tube inner wall engagers 112a and 112b (generally 112) extending from the spine 110, and a plurality of locking lips 114a and 114b (generally 114). The torque tube inner wall engagers and the locking lips are each configured to engage one or more first portions of the inner wall of the torque tube. More specifically, each torque tube inner wall engager 112 includes a top wall 116, at least one locking lip 114 which is attached to and extends from the top wall and a pair of spaced apart side walls 118a and 118b (generally 118). One end of each side wall is connected to one end of the top wall 116 and the opposite end of each side wall is connected to the spine 110. In one embodiment, the locking lips are configured to provide an interference fit by compressing when the chock strap retainer is inserted into the torque tube such that the top wall of the torque tube inner wall engager and the compressed locking lips each engage portions of the inner wall of the torque tube. It should be appreciated that any suitable number of torque tube inner wall engagers and any suitable configuration of such torque tube inner wall engagers may be implemented in accordance with the present disclosure. It should be further appreciated that any suitable number of locking lips and any suitable configuration of such locking lips may be implemented in accordance with the present disclosure.

In the embodiment illustrated in FIG. 10, the torque tube inner wall engagers are configured to provide a plurality of relief areas to enhance the molding process for a suitable plastic chock strap retainer. That is, the configuration of the torque tube inner wall engagers increases the cooling surface area of the formed chock strap retainer, thereby enabling trapped air and moisture to escape the plastic material as the chock strap retainer is formed. In one embodiment, the walls of the torque tube securer, the chock strap engager, and the stopping member are of uniform thickness to provide for easier cooling and to minimize or prevent any warping as the chock strap retainer is formed.

In the illustrated embodiment of FIG. 10, the chock strap engager 108 includes a torque tube engaging base 120 attached to the torque tube securer 106, an insertion end 122 of or attached to the torque tube engaging base 120, and a plurality of chock strap locking fingers or pins 124 attached to and extending from the torque tube engaging base 120. Such locking fingers or pins 124a to 124j are suitably formed to engage the chock strap of the wheel chock in multiple locations.

In one embodiment, each of the locking fingers are the same size and shape. In another embodiment, a plurality of the locking fingers are each a different size. In another embodiment, a plurality of the locking fingers are each a different shape. In another embodiment, a plurality of the locking fingers are each a different size and shape. For example, as seen in FIG. 10, locking finger 124a is a first size and shape, locking fingers 124b to 124i are a different size and shape, and locking finger 124j is another different size and shape. It should be appreciated that any suitable number of locking fingers and any suitable configuration and size of such locking fingers may be utilized in accordance with the present disclosure.

In one embodiment, the head or stopping member 104 includes one or more gripping members 126a and 126b to enable a loader to grip and remove the chock strap retainer from insertion into a torque tube of the wheel chock. In one such embodiment, a hole 128 is formed in the stopping member. In this embodiment, the hole is configured to receive one or more tools which, when inserted, enable a loader to maneuver the chock strap retainer.

Figure 11:
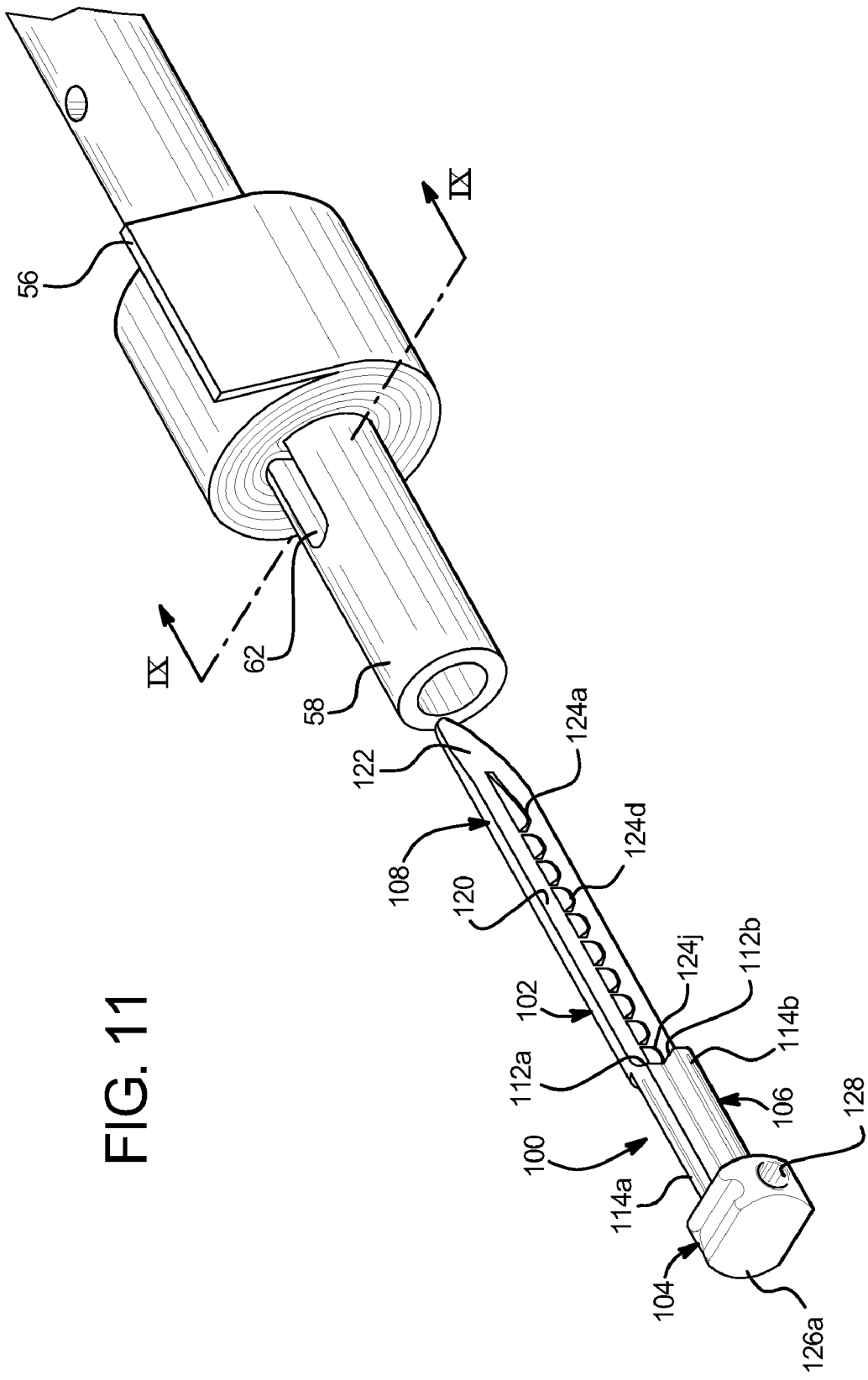
FIG. 11 is a top front exploded fragmentary perspective view of a torque tube of the wheel chock and one embodiment of the chock strap retainer disclosed herein, illustrating the chock strap retainer separate from the torque tube prior to insertion into the torque tube.
Figure 12:
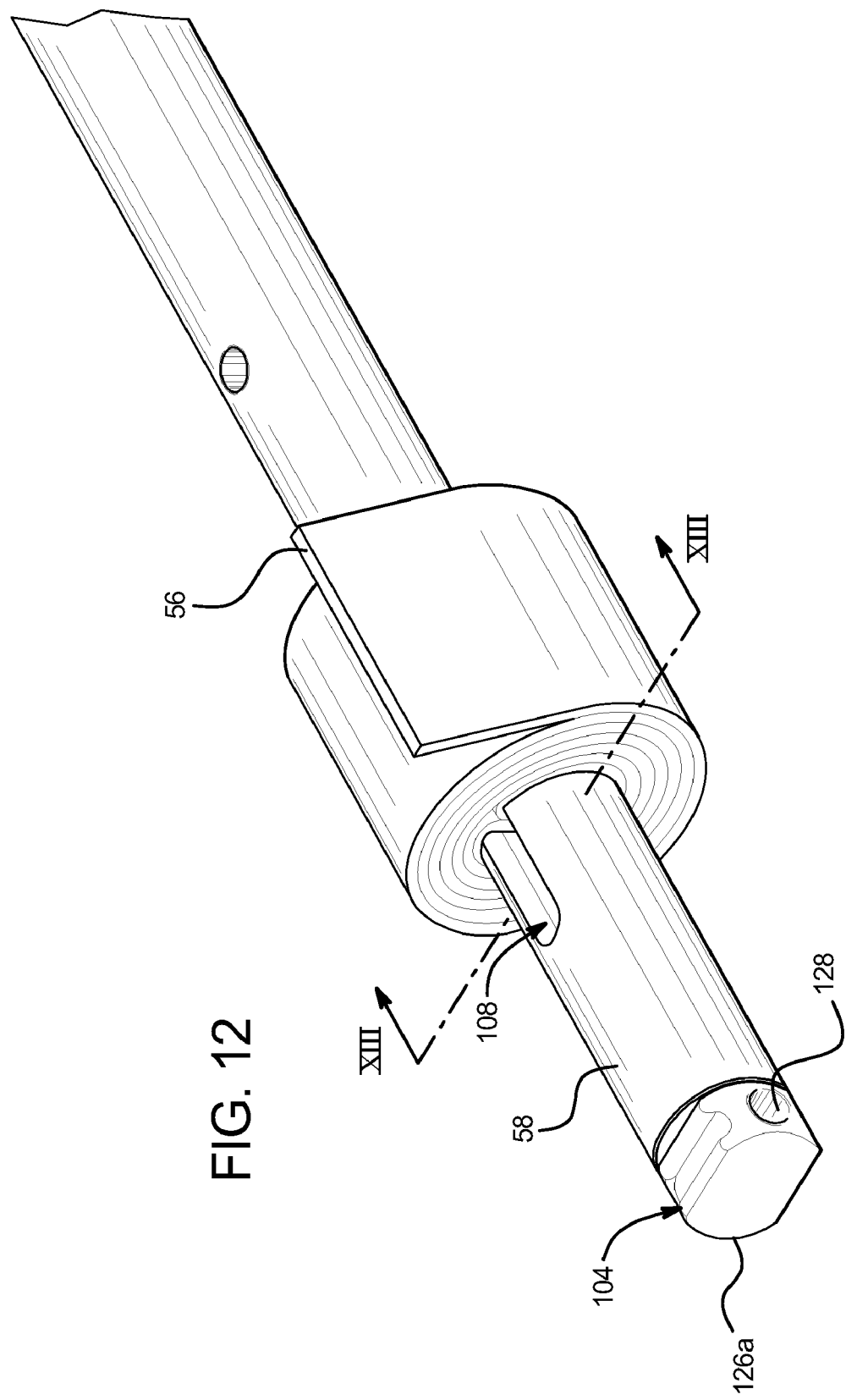
FIG. 12 is a top front fragmentary perspective view of a torque tube of the wheel chock and one embodiment of the chock strap retainer disclosed herein, illustrating the chock strap retainer inserted into the torque tube.

In use and operation, as seen in FIGS. 11 and 12, after a suitable chock strap 56 is affixed to the torque tube 58 of a wheel chock as described above, the chock strap retainer 102 is inserted into the torque tube 58. More specifically, the chock strap retainer is positioned parallel or substantially parallel to a free, open end of the torque tube (adjacent to the affixed chock strap) and a force is applied to the head 104 of the chock strap retainer to drive the chock strap engager 108 into the torque tube. As the chock strap engager is driven into the torque tube, the torque tube securer 106 is also driven into the torque tube. This process continues until the head 104 engages the torque tube. In this embodiment, the head is adapted to control the insertion of the body of the chock strap retainer into the torque tube to a desired length. That is, the head is configured to engage an outer end wall of the torque tube to prevent the chock strap retainer from being completely inserted into the torque tube.

Figure 13:
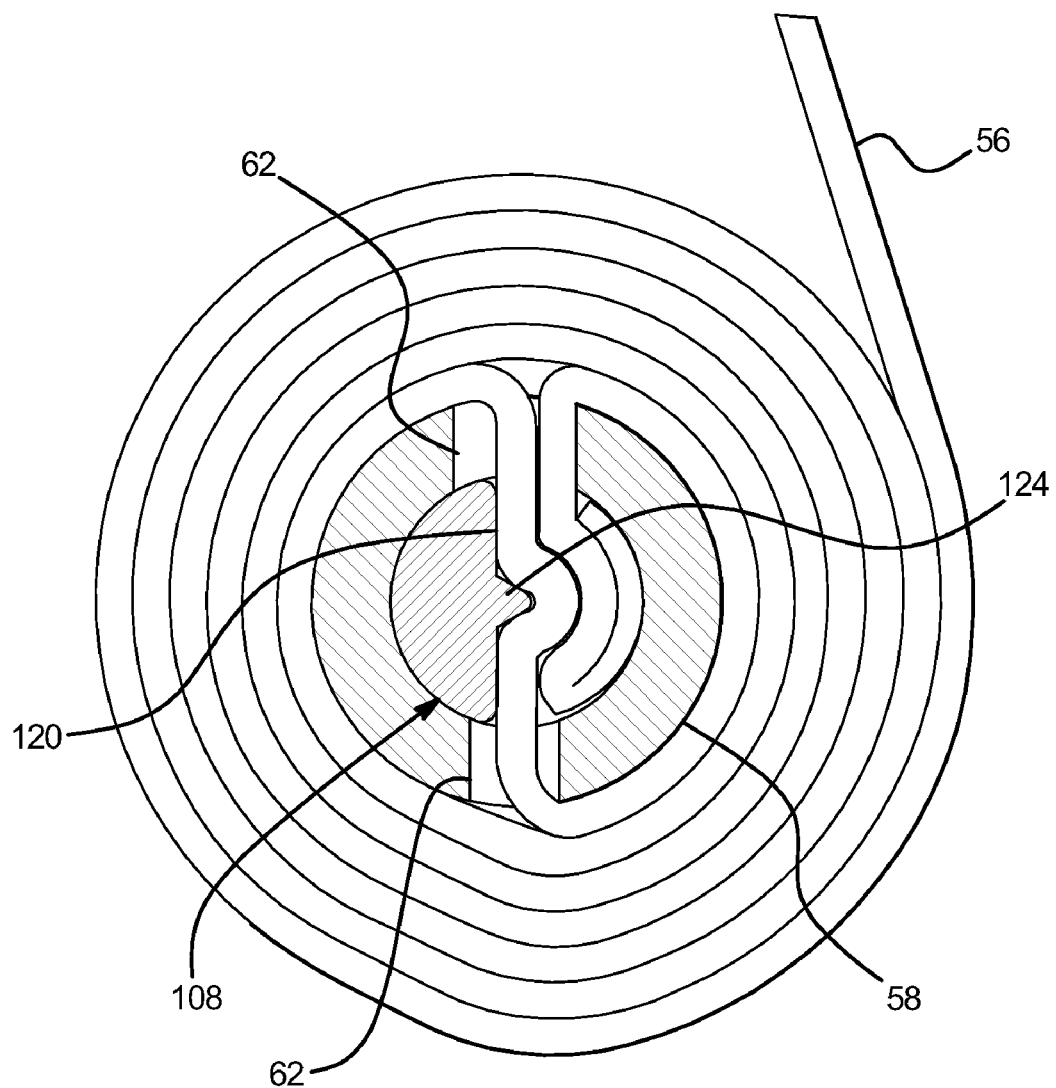
FIG. 13 is an enlarged partial fragmentary side view and partial sectional view of a chock strap affixed to the torque tube of the wheel chock and one embodiment of the chock strap retainer disclosed herein taken substantially along line 13--13 of FIG. 12, and, illustrating the interior of the torque tube after the utilization of the chock strap retainer disclosed herein.

In one embodiment as seen in FIGS. 10, 11, and 13, when the chock strap retainer is inserted into the torque tube, the torque tube securer 106 secures the chock strap retainer inside the torque tube and the chock strap engager 108 engages the chock strap situated inside the torque tube. As best seen in FIG. 13, this configuration ensures that the chock strap remains securely pressed against the inner wall of the torque tube (and thus the chock strap remains securely inserted inside the torque tube, even when the chock strap is tensioned). Specifically, in the illustrated embodiment, the locking lips 114 and the top wall 116 of the torque tube inner wall engagers 112 of the torque tube securer 106 engage first portions of an inner wall of the torque tube, the torque tube engaging base 120 engages second portions of the inner wall of the torque tube and the locking fingers or pins 124 of the strap engager engage multiple sections of the chock strap in the torque tube. It should be appreciated that as the chock strap retainer disclosed herein may be utilized in association with a plurality of different wheel chocks (and such different wheel chocks have different sized torque tubes and different positioned chock strap slots), one embodiment of the chock strap retainer includes locking fingers positioned along a length of the chock strap engager that is greater than the width of certain chock straps. In one embodiment, the locking fingers or pins of the chock strap engager engage the chock strap by digging into the chock strap (but not cutting or otherwise damaging the chock strap) to provide a secure engagement between the chock strap and the chock strap retainer.

Such a configuration provides that when tension is applied to the affixed end of the chock strap (i.e., the free end of the chock strap is draped over a vehicle wheel and drawn snug), the affixed end of the chock strap remains securely situated inside the torque tube and chock strap can be drawn in taut condition. That is, unlike known methods of merely threading the chock strap through the torque tube, the chock strap retainer disclosed herein provides that regardless of the dimensions of the chock strap utilized, such chock straps are held securely in the interior of the torque tube. This arrangement ensures that the chock strap can be drawn in taut condition (i.e., to restrain the wheel of the vehicle being transported) without the possibility of disconnecting the chock strap from the torque tube of the wheel chock to cause damage to the vehicle being transported.

Figure 14:
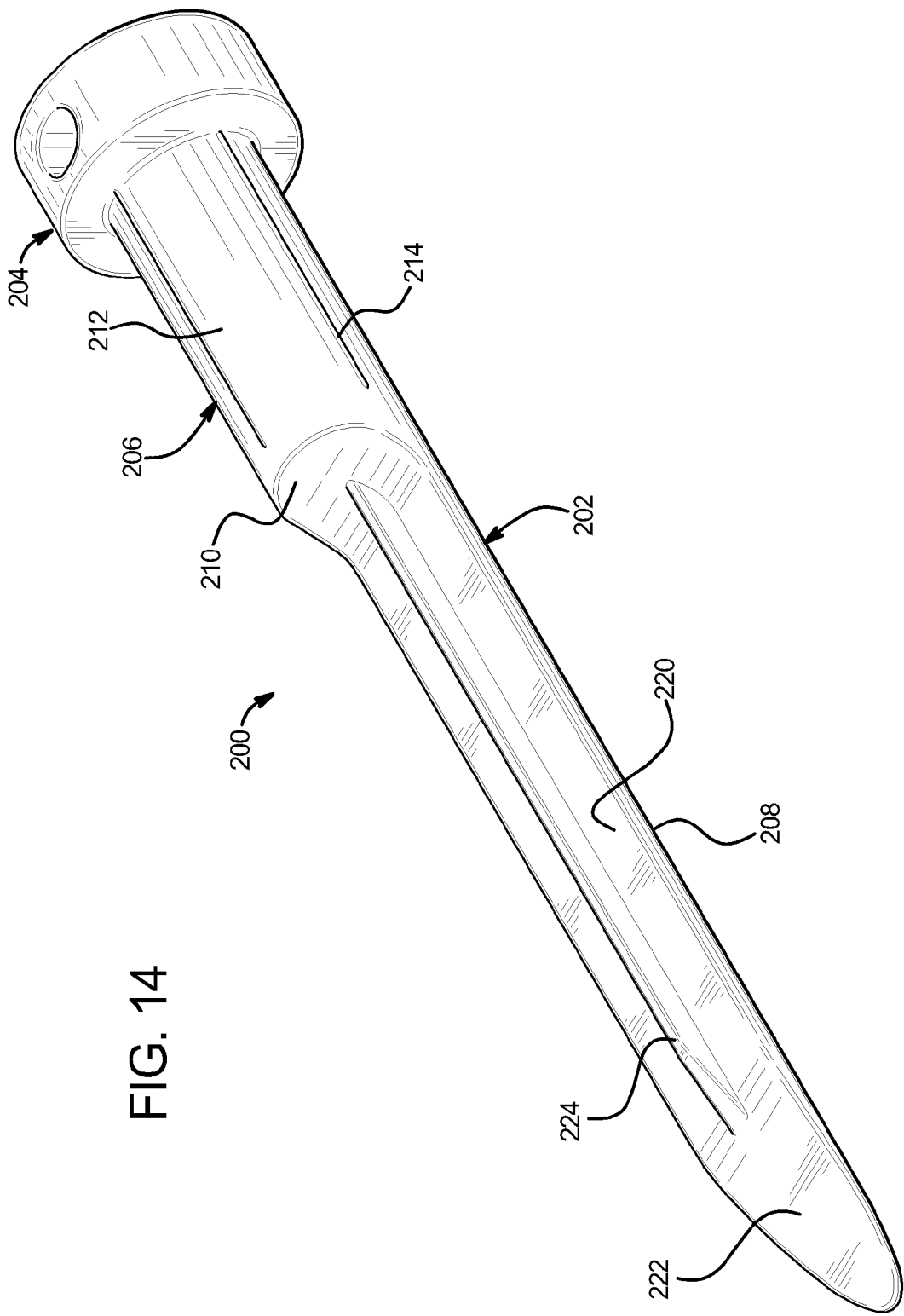
FIG. 14 is a top front perspective view of another embodiment of the chock strap retainer disclosed herein and illustrating a chock strap retainer with one elongated locking pin.

In another embodiment illustrated in FIG. 14, the chock strap retainer 200 includes a body 202 and a head 204 attached to one end of the body. The body 202 includes a torque tube securer 206 adjacent to the stopping member. In this embodiment, the torque tube securer includes a spine 210, a plurality of torque tube inner wall engagers 212 (with less or no relief area between adjacent torque tube inner wall engagers) and a plurality of locking lips 214 attached to and extending from the spine of the torque tube securer. It should be appreciated that in this embodiment, and in the embodiments illustrated in FIGS. 15, 16 and 17, the torque tube inner wall engagers are connected to each other or integrally formed without spaces between them. The torque tube inner wall engagers and the locking lips are configured to engage portions of an inner wall of the torque tube. The body also includes a chock strap engager 208 adjacent to the torque tube securer. In this embodiment, the chock strap engager includes a torque tube engaging base 220 attached to the torque tube securer 206, an insertion end 222 of a or attached to the torque tube engaging base, and one elongated locking finger or pin 224 attached to and extending from the torque tube engaging base. This elongated locking finger is suitably formed to engage different positions of the chock strap of the wheel chock to secure the chock strap inside the torque tube as described above.

Figure 15:
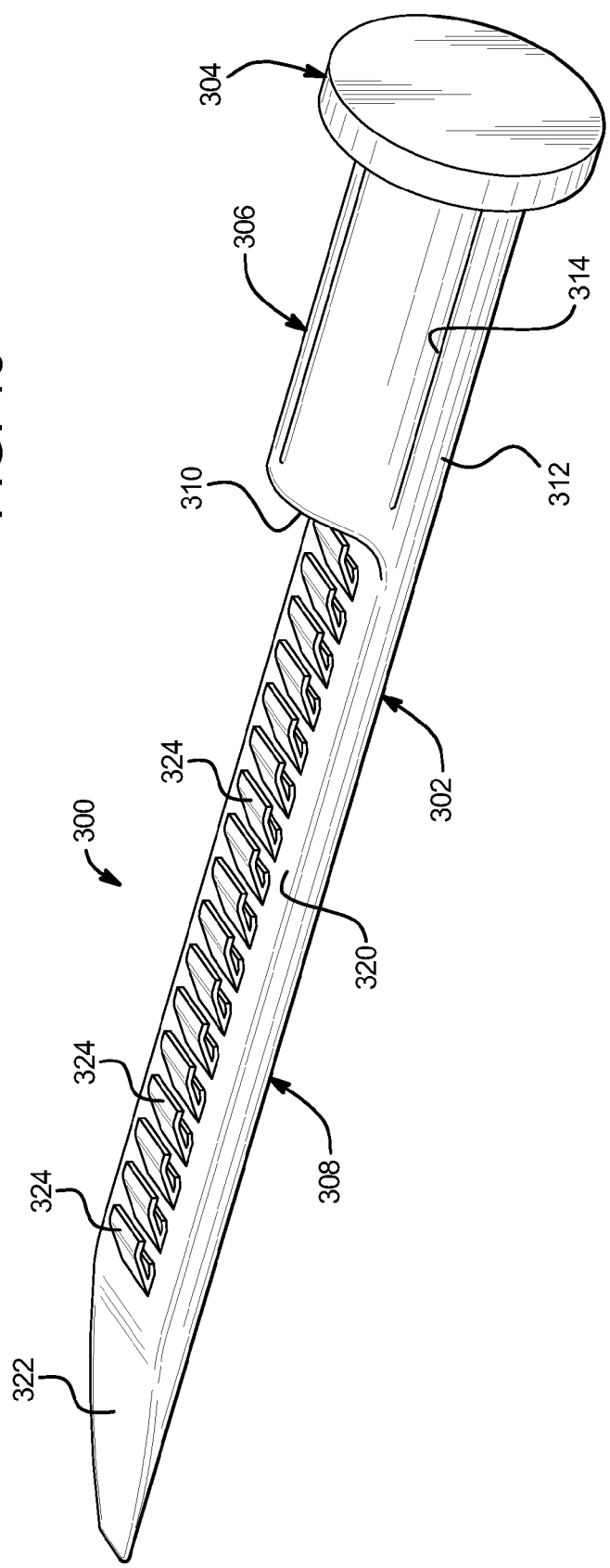
FIG. 15 is a top front perspective view of another embodiment of the chock strap retainer disclosed herein and illustrating a chock strap retainer with a plurality of locking pins.

In another embodiment illustrated in FIG. 15, the chock strap retainer 300 includes a body 302 and a head 304 attached to one end of the body. The body includes torque tube securer 306 adjacent to the stopping member and a chock strap engager 308 adjacent to the torque tube securer. In this embodiment, the torque tube securer includes a spine 310, a plurality of torque tube inner wall engagers 312 and a plurality of locking lips 314 attached to and extending from the spine of the torque tube securer. The torque tube inner wall engagers and the locking lips are configured to engage portions of an inner wall of the torque tube. In this embodiment, the chock strap engager includes a torque tube engaging base 320 attached to the torque tube securer 306, an insertion end 322 attached to the torque tube engaging base, and a plurality of locking fingers or pins 324 attached to and extending from the torque tube engaging base. These locking fingers are suitably shaped to engage the chock strap of the wheel chock to secure the chock strap inside the torque tube as described above. It should be appreciated that the locking fingers or pins can be of various suitable shapes or configurations.

Figure 16:
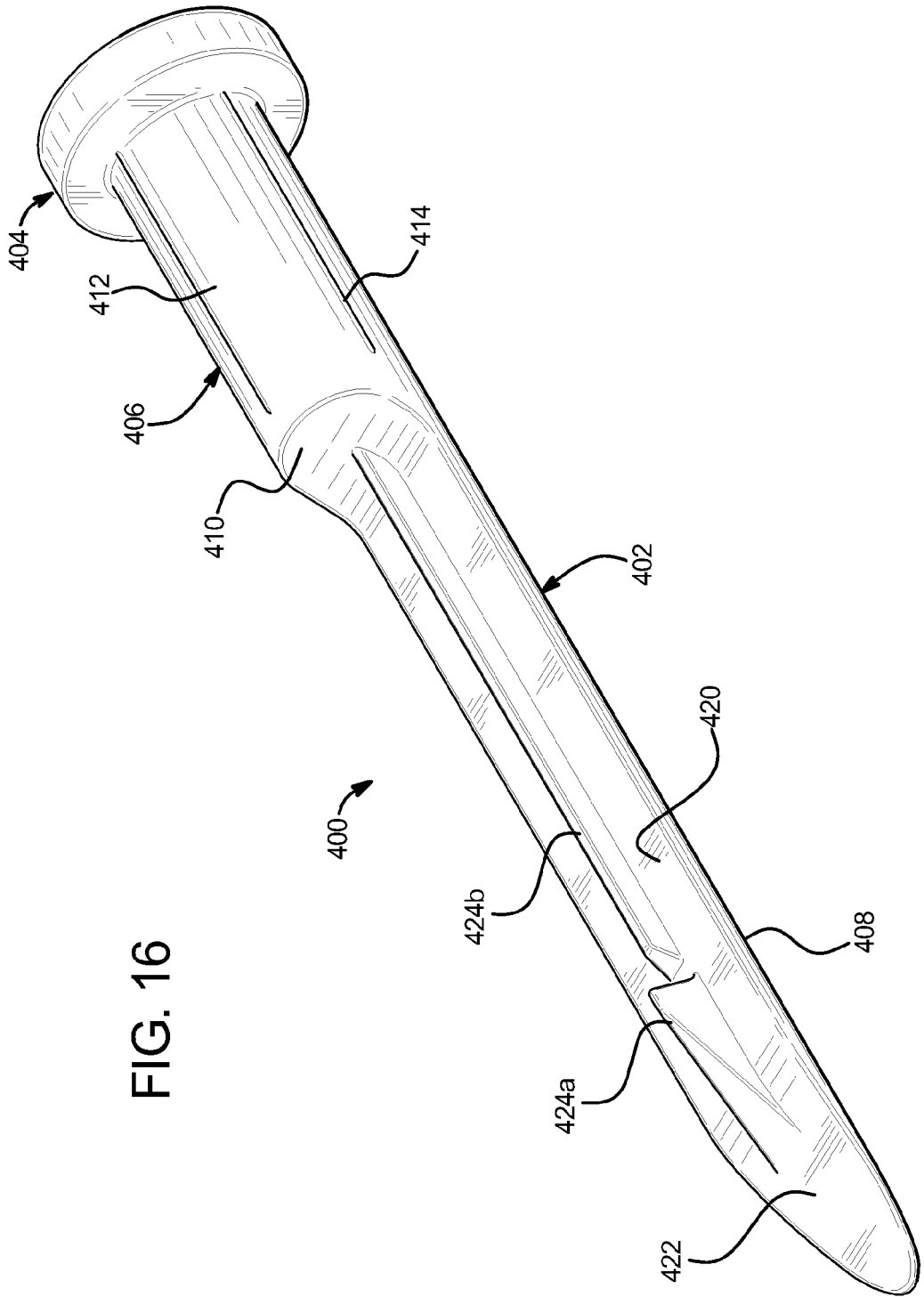
FIG. 16 is a top front perspective view of another embodiment of the chock strap retainer disclosed herein and illustrating a chock strap retainer with a plurality of locking pins of different configurations.

In another embodiment illustrated in FIG. 16, the chock strap retainer 400 includes a body 402 and a head 404 attached to one end of the body. The body includes torque tube securer 406 adjacent to the stopping member and a chock strap engager 408 adjacent to the torque tube securer. In this embodiment, the torque tube securer includes a spine 410, a plurality of torque tube inner wall engagers 412 and a plurality of locking lips 414 attached to and extending from the spine of the torque tube securer. The torque tube inner wall engagers and the locking lips are configured to engage portions of an inner wall of the torque tube. In this embodiment, the chock strap engager includes a torque tube engaging base 420 attached to the torque tube securer 406, an insertion end 422 attached to the torque tube engaging base, a locking member or locking pin 424a attached to and extending from the torque tube engaging base and an elongated finger or pin 424b attached to and extending from the torque tube engaging base. In this embodiment, the locking member is force fit past the chock strap (to engage the side edge of the strap to lock in place and prevent removal) and the elongated locking finger engages the chock strap of the wheel chock to secure the chock strap inside the torque tube as described above.

Figure 17:
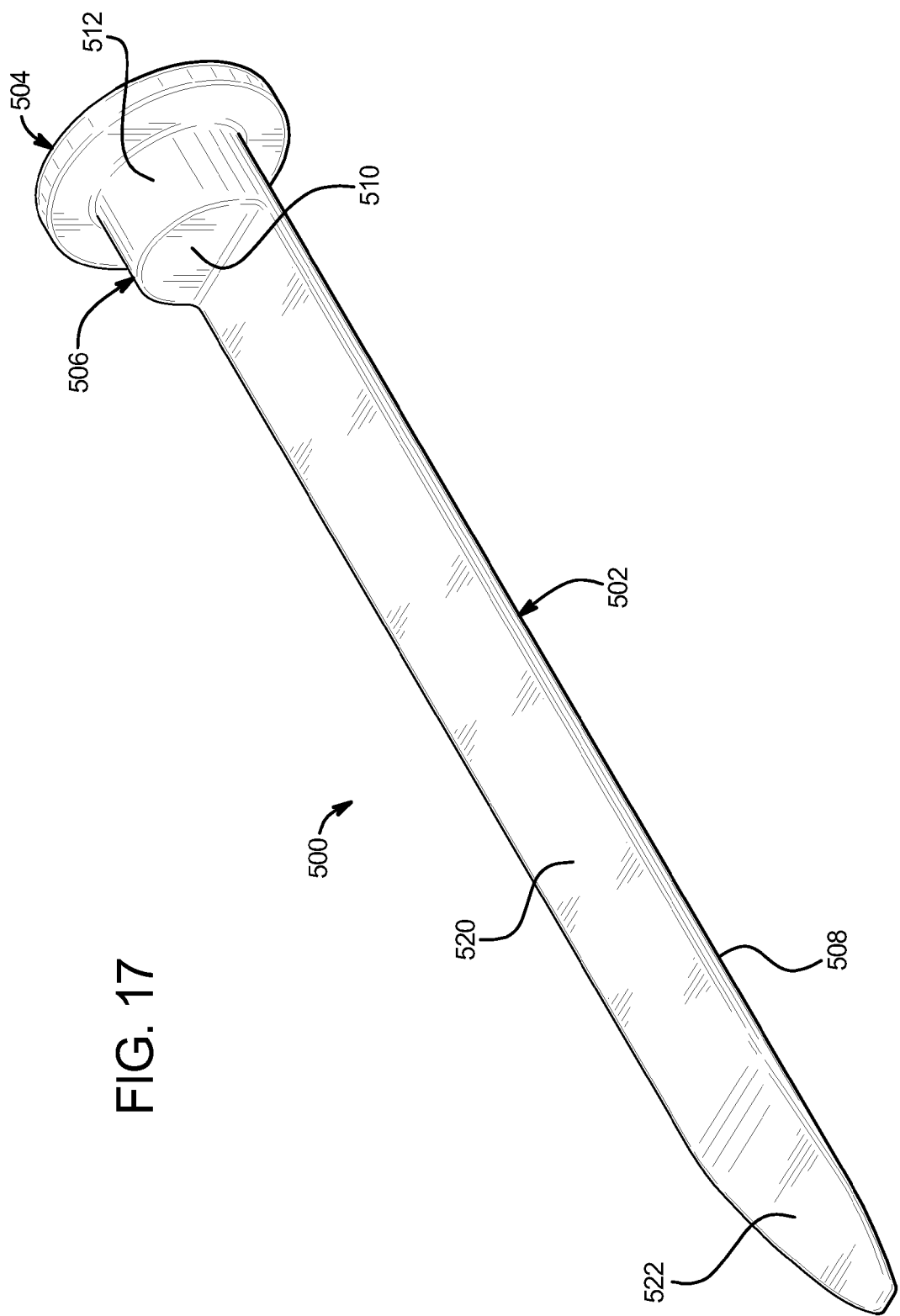
FIG. 17 is a top front perspective view of another embodiment of the chock strap retainer disclosed herein and illustrating a chock strap retainer with a strap engaging member formed to engage the chock strap of a wheel chock.

In another embodiment illustrated in FIG. 17, the chock strap retainer 500 includes a body 502 and a head 504 attached to one end of the body. The body includes a torque tube securer 506 adjacent to the stopping member and a chock strap engager 508 adjacent to the torque tube securer. In this embodiment, the torque tube securer includes a spine 510 and a plurality of torque tube inner wall engagers 512 configured to engage an inner wall of the torque tube. It should be appreciated that this embodiment does not include locking lips. In this embodiment, the chock strap engager includes a torque tube engaging base 520 attached to the torque tube securer 506 and an insertion end 522 attached to the torque tube engaging base. In this embodiment, a first side or wall of the torque tube engaging base is configured to engage the inner wall of the torque tube and a second side or wall of the torque tube engaging base is configured to engage the chock strap of the wheel chock to secure the chock strap inside the torque tube as described above. It should be appreciated that this embodiment does not include fingers or pins.

In another embodiment (not shown), the chock strap retainer includes a body and no head or stopping member. In this embodiment, the body includes: (a) a torque tube securer positioned at a first end of the body and configured to secure the chock strap retainer in the torque tube; and (b) a chock strap engager positioned at a second end of the body, attached to the torque tube securer and configured to secure the chock strap retainer in the torque tube. In one such embodiment, the torque tube securer includes a spine, a plurality of torque tube inner wall engagers extending from the spine, and a plurality of locking lips. Each locking members or lip extends from a respective one of the torque tube inner wall engagers. In one such embodiment, the chock strap engager includes a torque tube engaging base attached to the torque tube securer, an insertion end attached to the torque tube engaging base, and a plurality of chock strap locking fingers or pins attached to and extending from the torque tube engaging base. In one such embodiment, as described above, the chock strap engager is suitably formed such that: (i) at least a first portion of the chock strap engager is configured to engage one or more portions of the inner wall of the torque tube, and (ii) at least a second portion of the chock strap engager is configured to engage the chock strap of the wheel chock.

It should be appreciated that while the body of the chock strap retainer is described as an elongated member, any suitable shape or configuration that is capable of being removably inserted into the torque tube of a wheel chock may be implemented in accordance certain embodiments with the present disclosure. That is, other suitable configurations of the torque tube securer and chock strap engager may be implemented in accordance with the present disclosure.

It will be understood that modifications and variations may be effected without departing from the scope of the novel concepts of the present invention, and it is understood that this application is to be limited only by the scope of the claims.

The invention is claimed as follows:

1. A vehicle wheel chock strap retainer comprising:
a head; and
a body attached to one end of the head, said body including:
(a) a torque tube securer including:
(i) a spine,
(ii) a plurality of torque tube inner wall engagers extending from the spine, and
(iii) a plurality of locking lips, each locking lip extending from a respective one of the torque tube inner wall engagers, and
(b) a chock strap engager attached to the torque tube securer, the chock strap engager including:
(i) a torque tube engaging base,
(ii) an insertion end attached to the torque tube engaging base, and
(iii) a plurality of chock strap locking fingers attached to and extending from the torque tube engaging base.

2. The vehicle wheel chock strap retainer of claim 1, wherein the head includes at least one gripping member.

3. The vehicle wheel chock strap retainer of claim 1, wherein the head defines a hole configured to receive a maneuvering tool.

4. The vehicle wheel chock strap retainer of claim 1, wherein the torque tube inner wall engagers are spaced apart from one another.

5. The vehicle wheel chock strap retainer of claim 1, wherein each torque tube inner wall engager includes a top wall and spaced apart side walls.

6. The vehicle wheel chock strap retainer of claim 5, wherein for each torque tube inner wall engager, one of the locking lips extends from the top wall of said torque tube inner wall engager.

7. The vehicle wheel chock strap retainer of claim 1, wherein a plurality of the chock strap locking fingers have a same shape.

8. The vehicle wheel chock strap retainer of claim 1, wherein a plurality of the chock strap locking fingers have different shapes.

9. The vehicle wheel chock strap retainer of claim 1, wherein a plurality of the chock strap locking fingers are equally spaced apart on the torque tube engaging base.

10. The vehicle wheel chock strap retainer of claim 1, wherein the head and the body are integrally formed.

11. The vehicle wheel chock strap retainer of claim 10, which is molded from a plastic material.

12. A vehicle wheel chock strap retainer comprising:
a body, said body including:
a torque tube securer, said torque tube securer including a plurality of locking lips each configured to engage an inside wall of a torque tube of a vehicle wheel chock, and (ii) a chock strap engager, said chock strap engager including a plurality of locking fingers each configured to engage a first end portion of a chock strap threaded through the torque tube of the vehicle wheel chock, such that when tension is applied to a second, opposite end of the chock strap, said first end of the chock strap remains securely threaded through the torque tube of the vehicle wheel chock; and
a stopping member connected to the body.

13. The vehicle wheel chock strap retainer of claim 12, wherein the torque tube securer includes: a spine and a plurality of torque tube inner wall engagers extending from the spine, wherein each one of the plurality of locking lips extends from a different one of the torque tube inner wall engagers.

14. The vehicle wheel chock strap retainer of claim 12, wherein the chock strap engager includes a torque tube engaging base and an insertion end attached to the torque tube engaging base, and the plurality of chock strap locking fingers are attached to and extend from the torque tube engaging base.

15. A vehicle wheel chock strap retainer comprising:
a head; and
a body attached to one end of the head, said body including:
(a) a torque tube securer including a plurality of torque tube inner wall engagers, the torque tube securer including a plurality of locking lips, each locking lip extending from a different one of the torque tube inner wall engagers;
(b) a chock strap engager attached to the body, the chock strap engager including a torque tube engaging base.

16. The vehicle wheel chock strap retainer of claim 15, which includes at least one locking finger attached to and extending from the torque tube engaging base.

17. The vehicle wheel chock strap retainer of claim 15, wherein the chock strap engager includes a plurality of locking fingers attached to and extending from the torque tube engaging base.

18. The vehicle wheel chock strap retainer of claim 17, wherein the plurality of locking fingers are of different shapes.

19. The vehicle wheel chock strap retainer of claim 17, wherein a plurality of the locking fingers are of a same shape.

* * * * *